Figure 1:
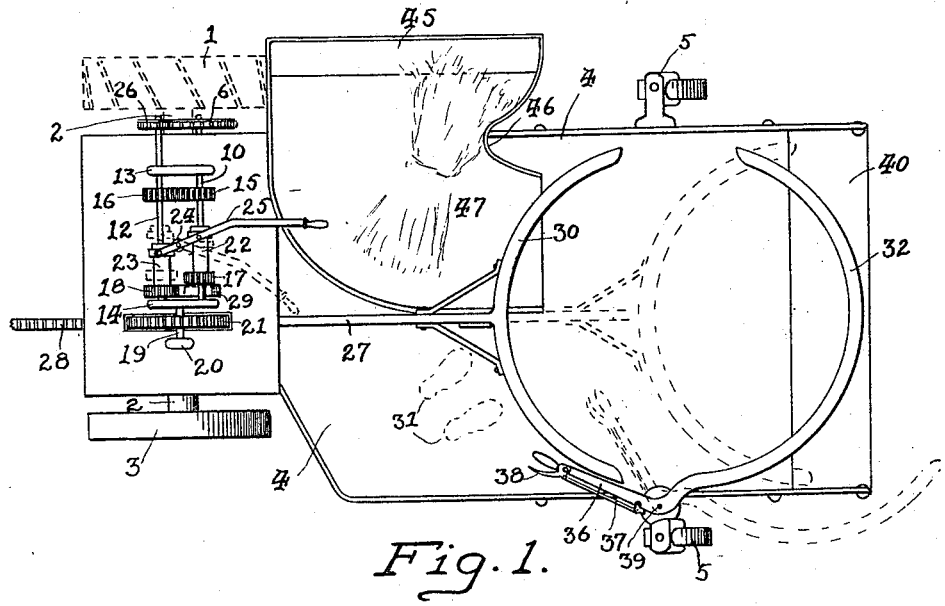

J. G. KERST.
SHOCKING ACCESSORY FOR HARVESTING MACHINES.
APPLICATION FILED JULY 10, 1913.

1,132,857.

Patented Mar. 23, 1915.
2 SHEETS—SHEET 1.

WITNESSES:
Leo Matthews
Sarah Schwartz

JOHN G. KERST
INVENTOR.

BY Fred D. Silloway
ATTORNEY

J. G. KERST.
SHOCKING ACCESSORY FOR HARVESTING MACHINES.
APPLICATION FILED JULY 10, 1913.

1,132,857.

Patented Mar. 23, 1915.
2 SHEETS—SHEET 2.

WITNESSES:
Leo Matthews
Sarah Schwarz

John G. Kerst
INVENTOR.
BY Fred. D. Silloway
ATTORNEY

UNITED STATES PATENT OFFICE.

JOHN G. KERST, OF SPRINGFIELD, ILLINOIS.

SHOCKING ACCESSORY FOR HARVESTING-MACHINES.

1,132,857.  Specification of Letters Patent.  Patented Mar. 23, 1915.

Application filed July 10, 1913. Serial No. 778,413.

*To all whom it may concern:*

Be it known that I, JOHN G. KERST, a citizen of the United States, residing at Springfield, in the county of Sangamon and State of Illinois, have invented new and useful Improvements in Shocking Accessories for Harvesting-Machines, of which the following is a specification.

My invention relates to improvements in grain harvesting machines, and refers more particularly to accessories to the ordinary types of grain harvesters.

The main object of my invention is to provide an accessory to a harvester which will receive the bundles of grain as they are delivered from the harvester, and upon which the grain shock may be assembled, and later delivered to the ground in its completed form.

A further object is to provide means for righting the bundles and delivering them butt end down with greatest facility to the assembling floor of my accessory, and to provide an easily controlled and efficient device for placing the completed shock upon the ground when assembled.

With these and other objects in view, the device of my invention consists of certain new and useful peculiarities in construction and arrangement of parts which will be hereinafter fully described and pointed out in the appended claims.

In the accompanying drawings wherein is illustrated the preferred embodiment of my invention, like reference numerals refer to like parts throughout the several views.

Figure 2:
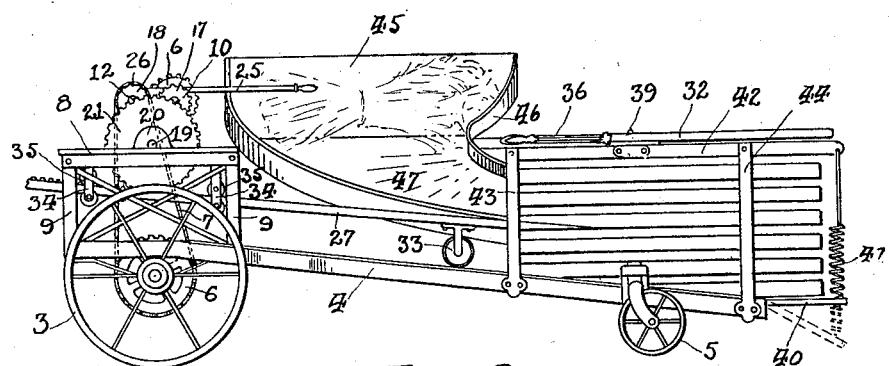
Figure 3:
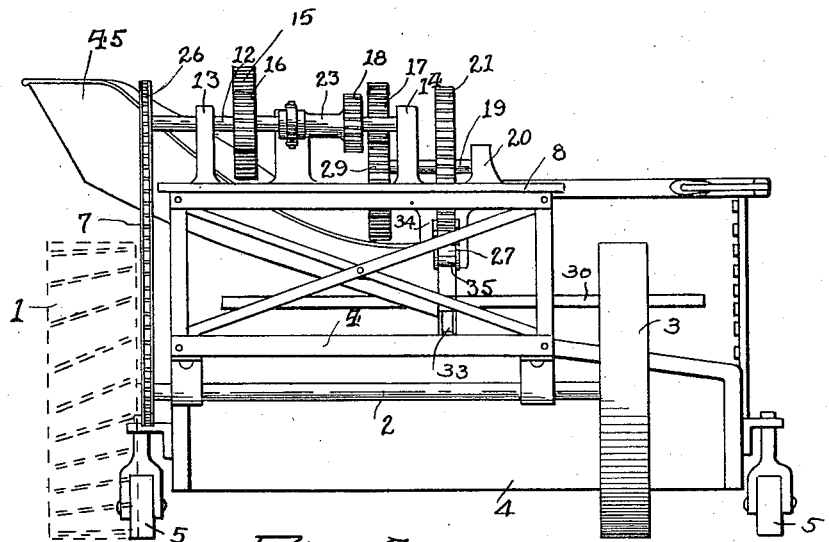
Figure 4:
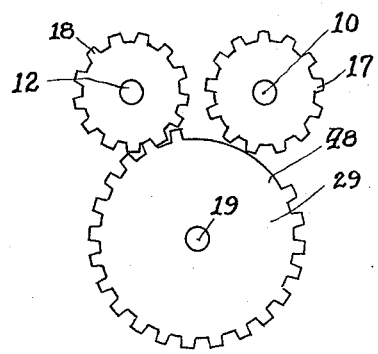

In the drawings: Figure 1 is a plan view of the device of my invention shown in its working position attached to the main axle of a harvester. Fig. 2 is a side elevation of my device. Fig. 3 is a front elevation of my device. Fig. 4 is a diagram of the driving gears by which the shock-delivering yoke is actuated.

Referring now to the drawings, numeral 1 designates one of the wheels of a harvesting machine, to which the axle 2 of my accessory may be attached by any suitable method, 3 being a traction wheel similar in diameter to the wheel of the harvester and carrying the outer end of axle 2.

Numeral 4 designates a platform or frame carried on the forward end by axle 2 and being supported at the rear by caster wheels 5.

Numerals 43 and 44 designate posts supporting side bars 42, and to which any desired side boards may be attached.

It will be noted by reference to Fig. 2 that the platform 4 is lower at the rear end, for a purpose which will be hereinafter fully explained.

Above platform 4, a second platform designated as 8 is provided, which platform is supported by upright members 9 from the main frame. On platform 8 are bearing pedestals 13 and 14 in which are mounted parallel shafts 10 and 12. Shaft 12 extends through pedestal 13 on the outer side and is provided with a sprocket wheel 26 adapted to be driven by a chain 7 from a sprocket wheel 6 carried on the hub of the harvester wheel. Shaft 10 is provided with a gear wheel 15 and shaft 12 with a gear 16, which gears are adapted to mesh, gear 16 driving gear 15 in the opposite direction from the revolution of shaft 12. Adjacent pedestal 14, shafts 10 and 12 are provided with another set of gears which are adapted to slide on said shafts, and which are designated respectively, as 17 and 18. Gears 17 and 18 are provided with elongated slide hubs 22 and 23 which are provided with slide collars and pivoting rings to which are pivoted an actuating lever 25. Lever 25 is pivoted to a pedestal carried by platform 8 midway between the sliding gears at a point designated as 24. It will be seen that by shifting the actuating lever 25 about the pivoting point 24 the gears 17 and 18 may be thrown into or drawn out of mesh with the gear wheel 29. On the opposite side of pedestal 14 and between said pedestal and a box bearing 20, a gear designated as 21 is mounted on shaft 19. Gear 21 extends downward through a cut-out portion in platform 8 and is adapted to mesh with a gear rack 28 carried on the upper side of shock-delivering bar 27. Brackets 34 extend downward from the under side of the platform 8 and are provided with pulleys such as 35 for the purpose of guiding the shock-delivering bar.

The shock-delivering device consists of a shock-delivering bar 27 located to travel on a line central with a grain shock, which bar is provided on its rear end with an arcuate arm or yoke 30. The rear end of bar 27 and yoke 30 are supported by a traction wheel 33 which is adapted to travel on the smooth surface of platform 4.

It will be seen that the method of driving my device is as follows: The harvester wheel travels in a counter-clockwise direction as viewed in Fig. 2 and gear 6 carried thereby will also travel in a counter-clockwise direction, transmitting through chain 7 the same rotation to gear 26 and through the medium of shaft 12 to gears 16 and 18. Gear 15, which is actuated by gear 16, will be rotated in a clockwise direction and also shaft 10 and gear 17. When gear 17 is drawn into mesh with gear 29, gear 29 will travel in a counter-clockwise direction and this rotation will be transmitted through shaft 19 to gear 21. Gear 21 being in mesh with gear rack 28, the rack will be actuated backward and yoke 30 will be moved to the position shown in dotted lines in Fig. 1. When gear 18 is in mesh with gear 29, the opposite motion will be transmitted to gear 21 and the gear rack and shock-delivering device will be drawn forward to the position shown in full lines in Fig. 1.

In order to limit the travel of the shock-delivering device I prefer to provide such an arrangement as is shown in Fig. 4. Numeral 48 designates a blank portion in gear 29, the teeth being removed. It will be seen that whenever the gear which is in mesh with gear 29 reaches this blank portion that further revolution in that direction will be stopped and that it will be necessary to throw the other gear into mesh in order to draw the shock-delivering device in the opposite direction. It will also be seen that from the arrangement of the gear shifting device shown in Fig. 1 that it will be impossible to have more than one gear in mesh at the same time.

In order to support the shock which is being formed by the operator of my device, yoke 30 and shocking arm 32 are provided. Shocking arm 32 is pivoted to a pedestal carried on the side of the machine at point 39. I provide a lever 36 having a spring catch 37 and a catch-actuating lever 38 attached thereto. It will be seen that by throwing lever 36 to the position shown in dotted lines that the shocking arm 32 may be removed after the shock has been formed and just before it is to be delivered to the ground.

In order to provide a device for righting the bundles of grain as they are delivered from the harvester, I provide a bundle-righting device such as 47. An inclined chute such as 45 receives the bundle of grain from the harvester and by gravity it will roll downward, the head of the bundle coming into contact with the curved abutting wall 46, allowing the butt end of the bundle to swing around and slide downward on to the shocking floor.

Numeral 40 designates a platform carried parallel with the ground and hinged to the rear end of platform 4. Coil springs such as 41 are hung from side bars 42 and are attached to the outer edge of platform 40, said springs being of sufficient strength to support said platform until the weight of the shock has been placed thereon, at which time platform 40 will tilt as is shown in dotted lines in Fig. 2 and allow the shock to settle upon the ground without being dropped the entire distance from platform 4 to the ground.

While operating my accessory, an attendant will stand in the approximate position shown in Fig. 1 and designated as 31. From this position he may place the bundles of grain on the shocking floor in their proper relation and when a shock has been assembled he will push lever 36 forward, causing shocking arm 32 to swing outward. He will immediately draw lever 25 to the dotted position shown in Fig. 1 when gear 21 will actuate bar 27 backward and yoke 30 will push the shock along the sloping shocking platform to the ground behind the moving machine.

From the foregoing description it will be readily seen that the device of my invention provides an accessory to a harvester which will receive the bundles of grain delivered therefrom and which will provide a convenient shocking floor from which the completed shock may be delivered to the ground with greatest facility. It will also be seen that I have provided a method for righting and delivering the bundles of grain butt end down to the shocking floor of my device which will be practically automatic in its operation and which will accomplish its work with the least difficulty.

While I have herein described the preferred embodiment of my invention I do not wish to be limited thereto, except for such limitations as the claims may import, as it is obvious that the details of construction and arrangement of parts may be varied in many ways.

Having thus described my invention, what I claim is:—

1. The combination in an accessory for a harvesting machine, of a frame structure mounted at the forward end on an axle, said axle supported on one end by a wheel and on the other end by one of the wheels of a harvesting machine, independent caster wheels supporting the rear end of said frame structure, said frame structure comprising a shocking platform, a bundle righting chute positioned over said platform and comprising a bottom inclined inward and rearward from the side of the accessory, said chute being provided on the forward side with a curved wall projecting upward at right angles from the bottom of the chute, said chute provided on the rear side with a wall also projecting upward at right angles from the chute bottom and having a forwardly projecting U-shaped bend positioned to engage the heads of the grain bundles, and said chute positioned to receive the bundles of grain delivered from said harvester and to right said bundles and to deliver them to the shocking platform, substantially as described.

2. The combination in an accessory for a harvesting machine, of a wheeled shocking platform attached to said harvester, a bundle righting chute carried by said platform to receive the bundles of grain delivered from said harvester, said bundle righting chute being provided on the forward side with an inclined curved wall extending inward from the mouth of the chute at right angles to the line of travel of the shocking platform and curved rearward and downward adjacent the center of the accessory, said chute being provided with an inclined wall on the rear side having a forwardly projecting U-shaped bend positioned to engage the head of a grain bundle, and said chute having a bottom inclined inward and rearward from the side of the accessory whereupon the bundle may gravitate inward and rearward, substantially as described.

3. The combination in a shocking accessory for a harvesting machine, of a shock-delivering bar adapted to be actuated longitudinally in a line central with a grain shock, a semi-circular yoke carried on the rear end of said delivering bar, a gear rack on said bar, an actuating gear for said gear rack, means for rotating said actuating gear in a counter-clockwise direction whereby a grain shock may be pushed rearwardly off of said shocking floor by the rearward actuation of said delivering bar, and means for rotating said actuating gear in a clockwise direction whereby the delivering bar may be returned, substantially as described.

4. The combination in a shocking accessory for a harvesting machine, of a shock-delivering bar having a fixed semi-circular yoke on the rear end thereof adapted to be actuated longitudinally in a line central with a grain shock, a gear rack on said bar, an actuating gear for said gear rack, means for actuating said actuating gear comprising a first gear fixed to the shaft of said actuating gear and provided with a blank portion in the periphery thereof whereby the travel thereof may be limited in either direction, a forward drive shaft for said first gear, a reverse drive shaft for said first gear, sliding gears mounted on said forward drive shaft and said reverse drive shaft, means for actuating said gears selectively into and out of mesh with said first gear whereby said shock-delivering bar may be actuated rearward and a grain shock pushed off of said shocking accessory and returned after such actuation, and means for driving said forward and reverse drive shafts from a harvesting machine, substantially as described.

5. The combination in an accessory for a harvesting machine having a grain shocking platform attached thereto, of a sprocket wheel attached to and rotated with a harvester wheel, a drive sprocket carried above said shocking platform, a drive chain entrained about said sprocket wheels, a drive shaft driven by said drive sprocket, a reverse shaft parallel to said drive shaft, an actuating gear for said reverse shaft carried on said drive shaft, an actuating gear on said reverse shaft meshing with said actuating gear on said drive shaft, a sliding gear on said drive shaft, a sliding gear on said reverse shaft, a gear carrying a blank portion in its circumference and adapted to mesh with either of said sliding gears, a shaft driven by said gear, a gear rack actuating gear mounted on said shaft and driven thereby, a gear rack carried by a shock-delivering bar, and a shock-delivering bar and yoke adapted to be actuated backward and forward by said chain of gears, substantially as described.

6. The combination in a shocking accessory for a harvesting machine, of a shocking floor whereupon the bundles of grain may be manually shocked, and means for arresting forward movement of the shocked bundles with the forward moving machine and the withdrawal of the platform from beneath the shock, said means comprising a shock-delivering bar adapted to be actuated rearward in a line central with the grain shock by a series of coacting gears in operative relation with the harvesting machine and the shock-delivering bar, substantially as described.

7. The combination in a shocking accessory for a harvesting machine, of a grain bundle receiving device adapted to deliver said bundles to a shocking floor, and a shock-delivering bar having a fixed semi-circular yoke on the rear thereof actuated longitudinally in a line central with a grain shock by reciprocating means from said harvesting machine, said reciprocating means comprising a series of coacting gears in operative relation with the harvesting machine and said shock-delivering bar, substantially as described.

8. The combination in an accessory for a harvesting machine, of a grain bundle receiving device comprising a bundle righting chute provided with a bottom inclined inward and rearward from the side of the accessory, said chute being provided on its forward side with a curved wall projecting upward at right angles from the bottom of the chute, said chute provided on the rear side with a wall also projecting upward at right angles from the chute bottom and having a forwardly projecting U-shaped bend positioned to engage the heads of the grain bundles, and said chute positioned to receive the bundles of grain delivered from said harvester and to right said bundles and to deliver them to the bottom of the chute, substantially as described.

9. The combination in an accessory for a harvesting machine, of a wheeled shocking platform attached to said harvester, a bundle receiving device spaced above the platform and comprising a chute having a bottom inclined inward and rearward from the side of the accessory, said chute provided on the forward side with a curved wall projecting upward at right angles from the chute bottom, said chute provided on the rear side with a wall also projecting upward at right angles from the chute bottom and having a forwardly projecting U-shaped bend positioned to engage the heads of the grain bundles, said chute positioned to receive the bundles delivered from said harvester and to right said bundles and to deliver them to the shocking platform, said shocking platform positioned to receive the grain bundles during the process of manually shocking the grain, said platform carrying a resilient apron comprising a single rectangular plate normally sustained in parallel relation to the ground, and said apron fixed to the platform to swing upward when so actuated by uneven ground and downward with the weight of a grain shock pushed thereover to permit the delivery of the completed shock close to the ground, substantially as described.

10. The combination in a shocking accessory for a harvesting machine, of a shock-delivering bar having a fixed semi-circular yoke on the rear end thereof adapted to be actuated longitudinally in a line central with a grain shock, rollers supporting the rear end of said bar, and means for actuating said bar backward and forward by a selective gear transmission comprising a series of co-acting gears in operative relation with a harvesting machine and a gear rack on said shock-delivering bar, substantially as described.

JOHN G. KERST.

Witnesses:
  LEO MATTHEWS,
  SARAH SCHWARTZ.

Copies of this patent may be obtained for five cents each, by addressing the "Commissioner of Patents, Washington, D. C."